United States Patent [19]

Shito

[11] 4,252,751
[45] Feb. 24, 1981

[54] FAN CONTROL SYSTEM FOR COOLING APPARATUS

[76] Inventor: Naomichi Shito, 5-16-11 Daizawa, Setagaya-ku, Tokyo, Japan

[21] Appl. No.: 91,760

[22] Filed: Nov. 6, 1979

[30] Foreign Application Priority Data

Jan. 19, 1979 [JP] Japan .................................. 54-3903
Jul. 10, 1979 [JP] Japan ................................ 54-86398

[51] Int. Cl.³ .............................................. B01F 3/04
[52] U.S. Cl. .................................... 261/26; 261/109; 261/DIG. 11; 415/17; 416/39
[58] Field of Search .......... 261/26, 96, 109, DIG. 11, 261/DIG. 34; 415/17, 26; 416/39

[56] References Cited

U.S. PATENT DOCUMENTS

| | | | |
|---|---|---|---|
| 2,253,406 | 8/1941 | Wagner | 416/39 |
| 2,287,297 | 6/1942 | Dewey | 261/26 |
| 2,669,404 | 2/1954 | Howard | 415/17 X |
| 2,939,687 | 6/1960 | Goettl | 261/26 |
| 3,130,557 | 4/1964 | McFarlan | 261/26 X |
| 3,494,109 | 2/1970 | Blazer et al. | 261/26 X |
| 3,630,496 | 12/1971 | Hurst et al. | 261/26 |
| 3,637,194 | 1/1972 | Swimmer et al. | 261/26 X |
| 3,637,195 | 1/1972 | Blazer et al. | 261/109 X |

Primary Examiner—Richard L. Chiesa
Attorney, Agent, or Firm—Bernard & Brown

[57] ABSTRACT

A fan control system for cooling apparatus such as cooling tower in which water and air are brought into contact together. According to this system, the running speed of the fan is continuously and proportionally changed responsive to the temperature of the cooling water or the external atmospheric conditions, to substantially control the cooling capacity of the cooling apparatus. The control system consists of a main fan motor, an electronic adjustment circuit and a power transmission means consisting of a variable pitch diameter belt speed changing means and a constant pitch belt reduction device, whereby the speed changing ratio of the belt speed chaning means is continuously and proportionally changed depending upon the control signals from the adjustment circuit. Further, the adjustment circuit may have a soft-start control circuit.

23 Claims, 10 Drawing Figures

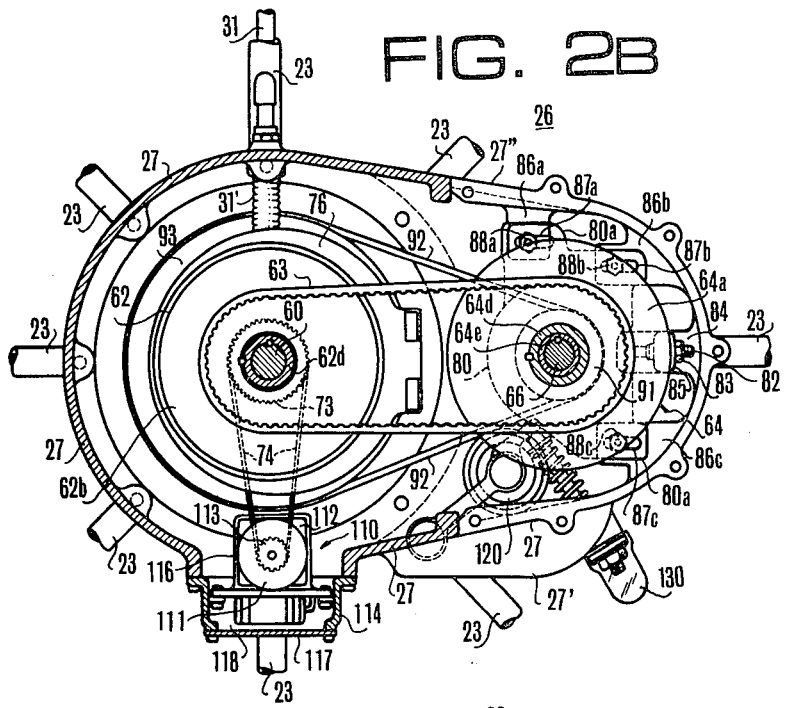
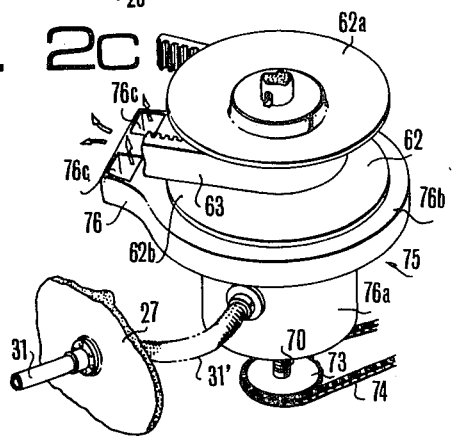

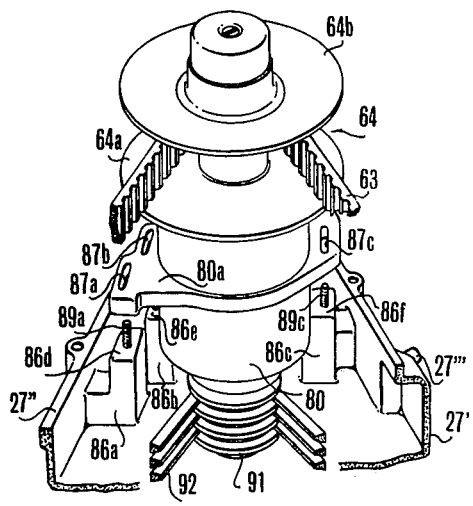
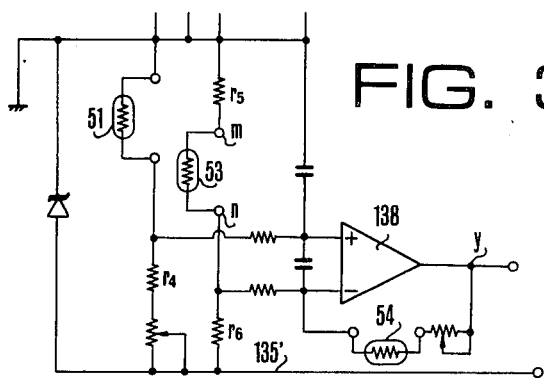

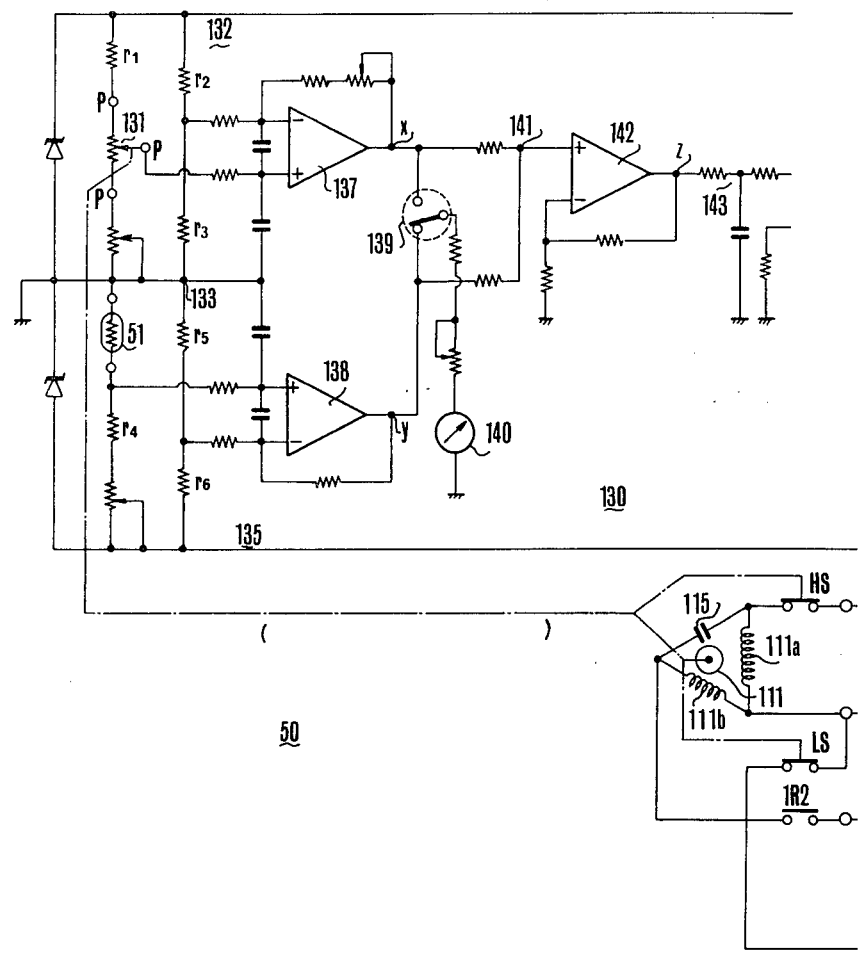
FIG. 3A1

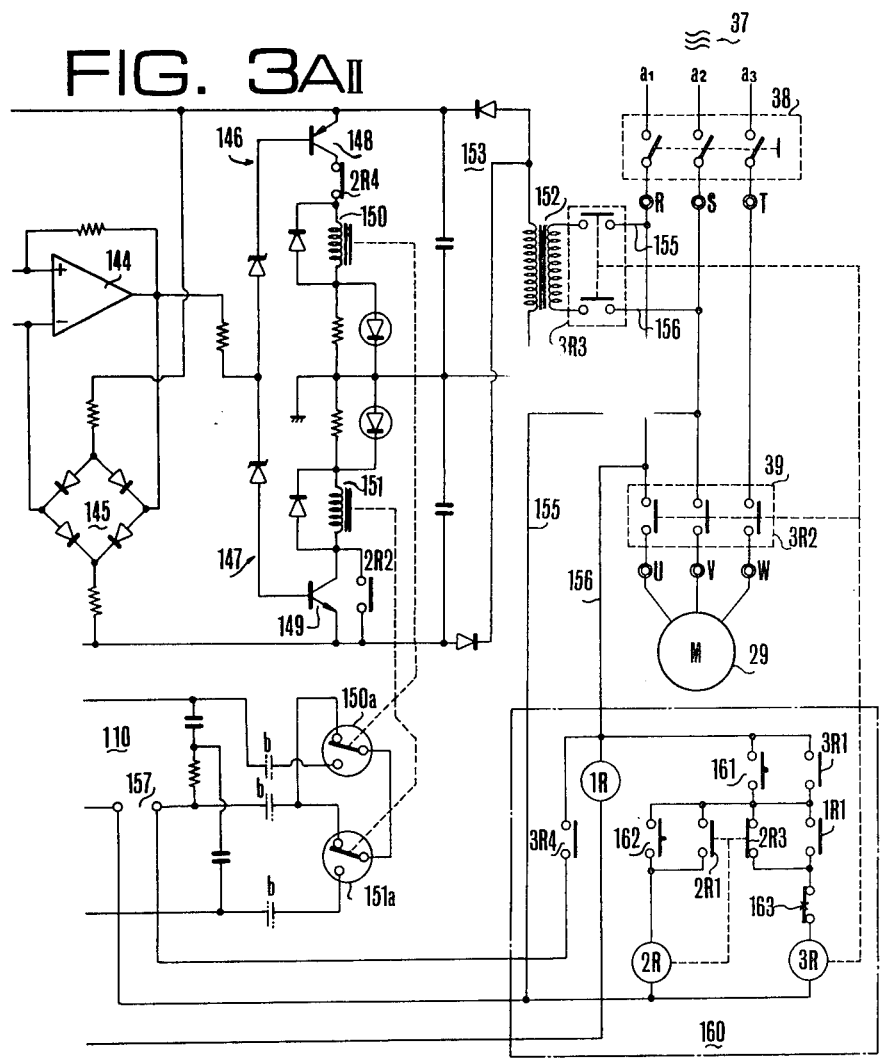
FIG. 3AⅡ

FAN CONTROL SYSTEM FOR COOLING APPARATUS

BACKGROUND OF THE INVENTION

This invention relates to an improved apparatus for forcibly bringing the air and water into contact together, and more specifically to an improved cooling apparatus such as cooling tower or evaporative condenser.

In general, when water sprayed into the air and fell onto a water vessel is pumped and is sprayed again repetitively, the temperature of water gradually approaches the wet bulb temperature of the air. Widely known cooling apparatus utilizing this principle may be represented by cooling towers or evaporative condensers. As is well known, according to such apparatus, the air stream is forcedly created in the tower by a fan in order to increase the contacting amount between water and air; hence the cooling capacity of such apparatus varies in proportion to the difference in enthalpy between the air and the air of a temperature equal to the temperature of the water. The enthalpy of the air is approximately represented by the wet bulb temperature. Substantially, therefore, it is proper to say that the cooling ability or capacity is dependent upon the difference between the wet bulb temperature of the outdoor air and the temperature of the cooling water at the inlet port. Consequently, the change in the outdoor air wet bulb temperature or in the temperature of the cooling water naturally causes the cooling capacity of the cooling tower to be varied.

According to most of the conventional cooling apparatus of this type, however, the water feeding rate L (kg/hr) and the air feeding rate G (kg/hr) have been maintained constant. it is a generally accepted idea that a refrigerator operates with a reduced load when the outdoor atmospheric or air temperature is low and when the outdoor air wet bulb temperature is low. In such a case, the cooling tower having increased cooling ability should be operated at reduced cooling capacity. In spite of this fact, however, the conventional cooling towers have not been controlled to follow such changes in temperatures.

In particular, the cooling towers are often irrationally operated during the seasons of spring and fall; the temperature of the cooling water is often excessively lowered. In winter, the temperature of the cooling water may further decrease, making it difficult to control the refrigerating capacity of the refrigerator, or giving rise to the occurrence of a refrigerant backing phenomenon or increase in the consumption of the electric power, causing the apparatus to become inoperative or presenting damage to the compresser finally.

In order to overcome such disadvantages, U.S. Pat. No. 2,287,297 discloses fan blades of a fan which can be varied. The fan having such variable blades, however, is very expensive, and permits the blowing amount of the air to be varied only within a narrow range, and is therefore not practicable. Another system to cope with the above-mentioned defects is to control the amount of the water supplied to the tower by providing a cross or three-way valve and a by-pass conduit between the cooling water inlet port and the cooling water outlet port of the cooling tower. This system, as is well known, has now been extensively used. However, since the amount of the cooling water is made variable, it is difficult to maintain desired cooling performance and to keep the cooling water at an uniform dispersion in the tower. A further method to cope with the above-mentioned defects consists of automatically controlling the start and stop of the fan and a fan motor. According to this method, however, the electric motor is very frequently started and stopped especially in the winter season, thus giving a conflicting nature to the recent tendency toward saving the energy. Therefore, it has been urged to provide a fan which suits for the cooling apparatus such as cooling tower, which can be cheaply manufactured, and of which the running speed can be continuously and proportionally changed.

SUMMARY OF THE INVENTION

The present invention is concerned with a fan control system for cooling apparatus such as a cooling tower, which eliminates all of the above-mentioned defects. The fan control system consists of a combination of a variable fan control device as a mechanical setup and an electronic adjustment circuit device as an electric setup, and is designed to substantially control the temperature of the cooling water which circulates through the cooling apparatus such as a cooling tower. Therefore, the control system operates substantially as an automatic capacity control system which controls the cooling capacity of the cooling apparatus of this type.

The fan control system is equipped with a very cheaply constructed belt drive transmission device having a variable pitch diameter belt speed changing device at the initial stage and a constant pitch belt reduction device at the next stage, and permits the reduction ratio to be continuously and proportionally changed relying upon the output of the electronic adjustment device. Relying upon the above setup, the running speed of the fan is controlled responsive to the external output control signals. Further, a heat-preventing means or radiator fan is added to prevent the belt from being heated, such that the life of the belt can be extended.

Although the electronic adjustment device employed here is a servo adjustment device, any device may be employed provided it detects the temperature of the cooling water and produce signals proportional to the temperature. The adjustment device electrically detects the temperature of the cooling water so that the fan is controlled responsive to the electric proportional outputs. It is therefore made possible to provide a fan which is suited for saving the energy. It is further possible to compensate the cooling capacity based on outdoor air conditions such as outdoor air enthalpy and outdoor wet bulb temperature, such that the adjustment device sufficiently exhibits its functions not only during the spring and fall seasons but during the winter season as well. The adjustment device works responsive to the change in climate in a single day, thereby to minimize the noise as well as to prevent cooling water to be carried over. The adjustment device may be equipped with a soft-start circuit so that the system always starts with the state of small load of the fan. Besides, since apparatus such as refrigerator is operated under optimum refrigerating conditions, the consumption of electric power can be reduced also in such an equipment relating thereto.

BRIEF DESCRIPTION OF THE DRAWING

FIGS. 2A to 2F are views showing the setup of a fan which constitutes a portion of the control system, in which FIG. 2A is a view illustrating the whole setup of the fan, FIG. 2B is a cross-sectional view along the line B—B' of FIG. 2A, FIG. 2C is a perspective view illustrating a portion of a pulley on the drive side, FIG. 2D is a cross-sectional view illustrating a pilot electric control unit, FIG. 2E is a cross-sectional view along the line E—E' of FIG. 2A, and FIG. 2F is a perspective view illustrating a portion of a pulley on the driven side;

FIG. 3A is a wiring diagram of an electronic adjustment circuit which constitutes another portion of the fan control system; and FIG. 3B is a diagram of a bridge circuit of the adjustment circuit according to another embodiment.

DETAILED DESCRIPTION OF PREFERRED EMBODIMENTS

An embodiment of the invention is illustrated below in detail with reference to the drawings. The cooling apparatus referred to in this invention may be of any type provided water and air are contacted to each other therein. The following description, however, deals with a cooling tower.

Figure 1:
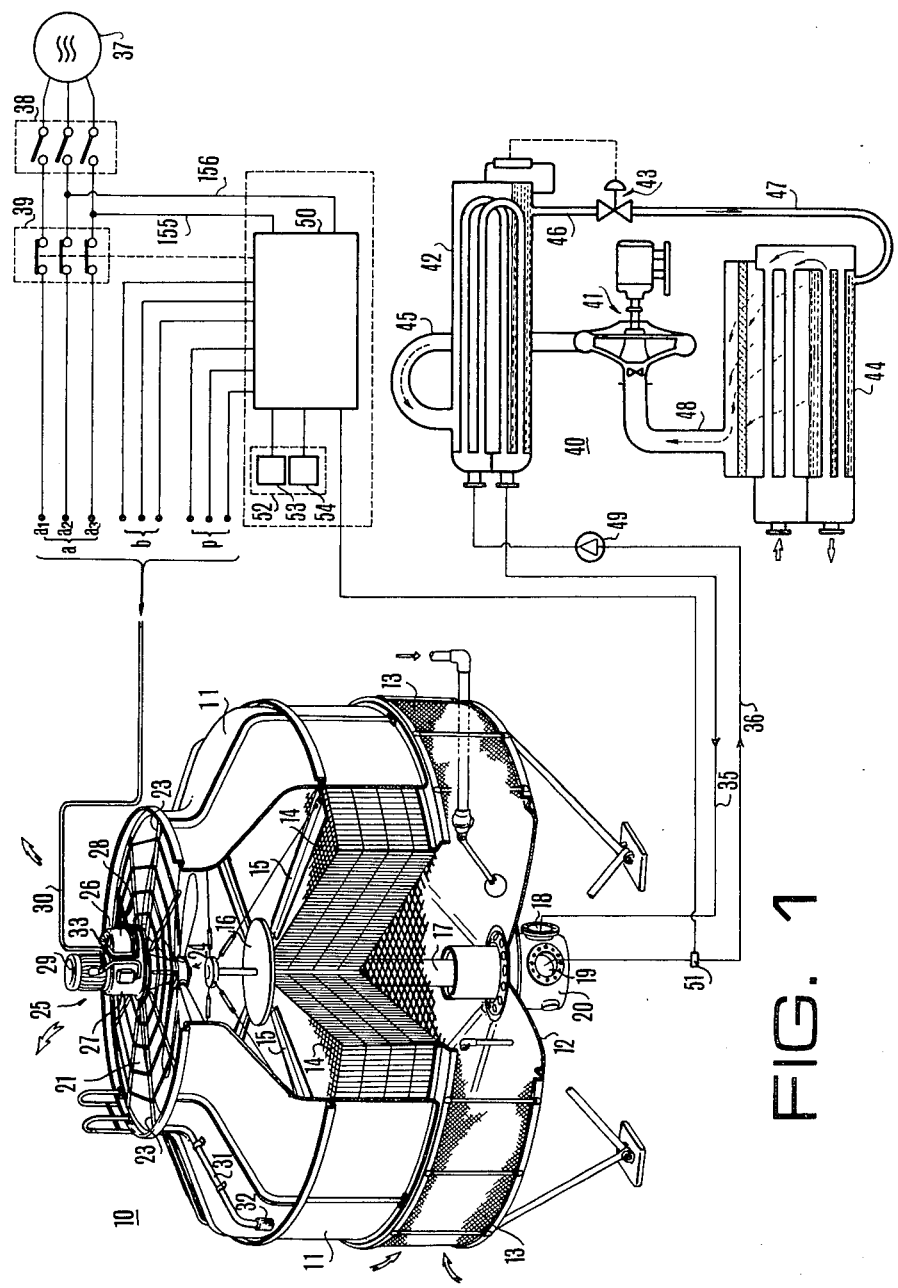
FIG. 1 is a view schematically illustrating a cooling apparatus to which is applied a fan control system according to an embodiment of the present invention.

FIG. 1 shows a relation among a suction-type counter-current cooling tower, an electronic adjustment device and a turbo refrigerator. Although the description deals with the refrigerator, any other sources of heat may of course be employed. Reference numeral 10 denotes a counter-current cooling tower consisting of side boards 11 made of an FRP, which are narrowed toward their tip as defined by taking the hydrodynamics into consideration and a reservoir 12. Between these two members is placed a punched metal louver 13 to form air-intake ports. In the cooling tower are arrayed fillings or packagings 14, a sprinkling main conduit 17, sprinkling or distributor pipes 15 and a mist eliminator 16 in a customary manner. The cooling water flows through an inlet port 18, the sprinkling main conduit 17 and four distributor pipes 15, sprinkled onto the fillings 14, and flows from the reservoir 12 toward an outlet port 19 via a falling vessel 20.

Above the side boards 11 are located air-blowing ports 21 where eight pipe stays 23 are arrayed in a radial manner, and a fan 25 is mounted at the center thereof. The fan control device 25 is made up of a three-phase induction motor 29, a belt drive transmission device 26 enclosed in a box-like frame 27 and sealed by a covering 28, and an axial-flow-type blowing fan 24. Further, to prevent the heat from being built up in the chamber of the sealed transmission device 25, the cooling air containing less moisture is introduced into the sealed chamber from an inlet port 32 via a conduit 31 and is exhausted through an exhaust port 33. The cooling tower of this type has been widely known except the fan 25 and conduit 31. The fan may be a centrifugal fan. The cooling tower 10 of this type has been employed in the fields of chemical industries, iron manufacturing, electric power stations and the like. According to the embodiment of this invention, however, the fan is used for the field of air conditioning systems and is communicated with a turbo refrigerator 40 via an inlet conduit 35 and an exhaust conduit 36, so that the cooling water circulates between a condenser 42 of the refrigerator 40 and the cooling tower 10 being pumped by a pump 49. As is well known, the turbo refrigerator 40 consists of a compressor 41, a condenser 42, an expansion valve 43 and an evaporator 44, which are communicated through refrigerant conduits 45, 46, 47 and 48. Here, the operation of the refrigerator 40 is omitted. It should, however, be noted that the heat generated in the condenser 42 must be released to the external side, i.e., the heat must be emitted to the cooling water.

On the other hand, the blower or fan control device 25 which constitutes a major portion of the present invention is connected to a three-phase a-c power supply 37 and to an electronic adjustment device 50 via wiring 30 which includes three-phase power lines a, and signals lines b and p, as will be explained below. Depending upon the temperature signals of the detector 51 which detects the dry bulb temperature of the cooling water at the outlet port, the adjustment device 50 produces the output signals which are transmitted through the signal line b to a belt drive transmission device 26 to proportionally control the speed changing ratio of the transmission device 26, and further produces switching output signals to a switch 39 inserted in the power lines a, whereby the operation of the main motor 29 and the operations of the adjustment device 50 and the transmission device 26 are automatically controlled in a manner that they work in harmony with respect to each other, as will be described subsequently. The signal for controlling the speed changing ratio of the transmission device 26 may be produced depending only upon the temperature of the cooling water at the outlet port. The adjustment device 50, however, may be variously modified. For example, the cooling capacity of the cooling tower 10 may be controlled depending upon the outdoor atmospheric conditions as illustrated in FIG. 1. For this purpose, a detector 52 for detecting the outdoor atmospheric conditions may be connected to a bridge circuit in the adjustment device 50, or a detector for detecting the outdoor wet bulb temperature or an outdoor enthalpy detector may be provided. Or the outdoor atmospheric conditions may be substantially compensated by cheaply constructed detector means which is made up of the combination of a detector for detecting the temperature of the outdoor air or atmosphere and a detector 54 for detecting the outdoor atmospheric humidity as illustrated in FIG. 1.

Below is mentioned the setup of the fan control device 25 which constitutes a portion of the fan control system of an embodiment of this invention, with reference to FIGS. 2A to FIG. 2F.

Figure 2A:
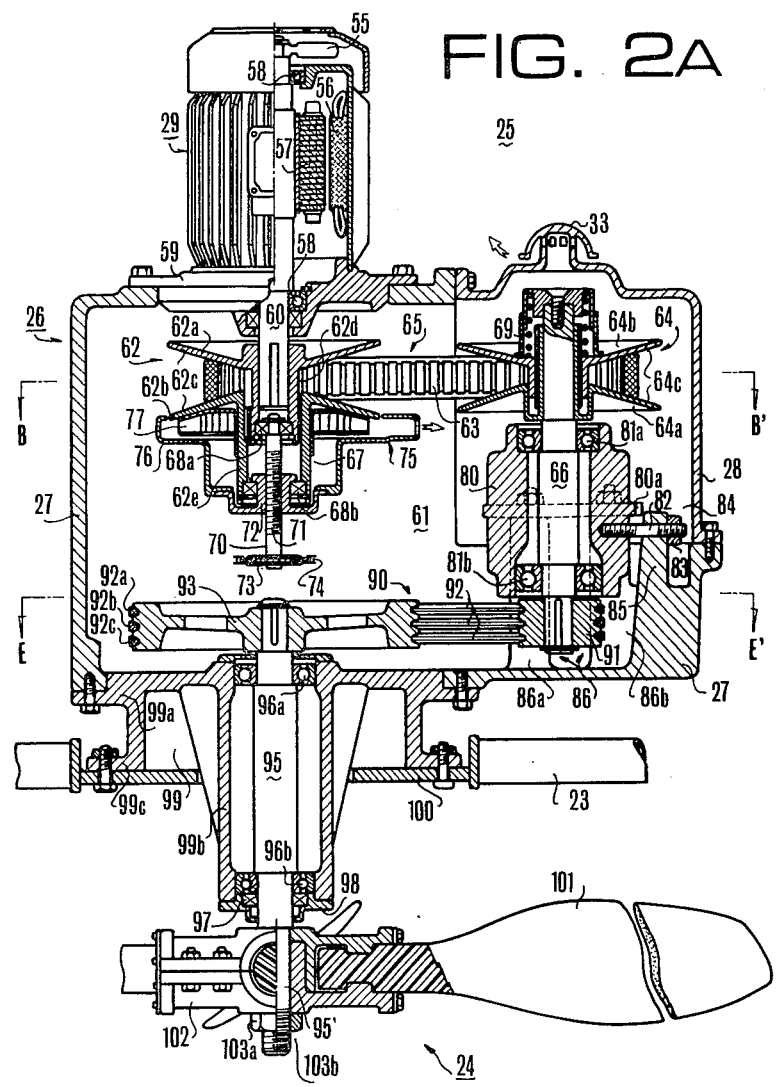

FIG. 2A is a cross-sectional view of a portion of the fan control apparatus 25 which constitutes a major portion of the invention. The same members as those of FIG. 1 are denoted by the same reference numerals.

As mentioned earlier, a variable fan control device 25 consists of an ordinary induction motor 29, a variable belt drive transmission device 26 and fan means 24. According to this embodiment, the above-mentioned three elements are assembled as a unitary structure. As will be mentioned later, however, the fan means 24 may be installed in an air-blowing port 21 of the cooling tower, and the motor 29 and the transmission device 26 may be installed in the vicinity of the air-blowing port 21 so as to be interlocked to each other. The three-phase a-c induction motor 29 is usually placed in the high humid atmosphere or moisture area in the air-blowing port 21 of the cooling tower. Therefore, the induction motor 29 must be of the sealed type equipped with a small heat-radiating fan 55. As is well known, the motor 29 includes a stator 56 and a rotor 57, and an input rotary shaft 60 is supported by two bearings 58. The motor 29 is bolted to a box-like frame 27 of the belt transmission device 26 via a flange 59, and the rotary shaft 60 which serves as an input shaft is stretching into the frame. A sealed chamber 61 for the belt drive transmission device 26 is formed by a frame 27 and a covering 28 made of an aluminum alloy to reduce the weight. Pulley means or sheave means 62 of the driving side is attached via a key to the tip of the input shaft 60 which is introduced into the sealed chamber. The pulley or sheave means 62 constitutes a speed changing device of the initial stage, i.e., constitutes a variable pitch diameter belt speed changing device 65 together with pulley means or sheave means 64 on the driven side, thereby to transmit the rotational power to an intermediate rotary shaft 66. The variable pulley means or sheave means 62 and 64 on the drive side and driven side constitute a pair of pulley mechanisms with fixed pulleys 62a and 64a having conical contact surfaces 62c and 64c, and slide pulleys 62b and 64b having conical contact surfaces 62c and 64c. The inclined surfaces of the fixed and slide pulleys are so disposed that a variable belt 63 can be held between the valleys of the individual pulleys. Here, the positions of the fixed pulley and slide pulley on the driving side and on the driven side are reversed with respect to each other, such that the belt 63 can be maintained in a horizontal state even when the belt is moved toward the right or the left. The pulley or sheave means 62 on the drive side is equipped with a speed changing ratio control device 67 for forcibly controlling the distance between the fixed pulley 62a and the slide pulley 62b. The control device 67 has a control pole 70 which is supported, via bearings 68a and 68b, between a cylindrical portion 62d of the pulley 62a and a cylindrical portion 62e of the pulley 62b which are fitted together, via an oil-less metal. The control device 67 further has a guide 72 which fits to a threaded groove 71 formed in the pole 70. To the tip of the control pole 70 is attached a sprocket 73 which connects to a pilot control device via a chain 74 as will be explained subsequently. When the control pole 70 is rotated accompanying the turn of the sprocket 73, the guide 72 is caused to move along the threaded groove 71 in the upper and lower directions with respect to the pole 70. Accompanying this motion, the slide pulley 62b only is allowed to slide in the upper and lower directions with respect to the fixed pulley 62a, whereby it is allowed to vary the radius of contacting circle between the belt 63 and the pulley means 62. With regard to the pulley means 64 on the driven side, on the other hand, the slide pulley 64b is always pressed onto the fixed pulley 64a with a predetermined pressure of spring. Hence, as the belt 63 is caused to move by the operation of the pulley means 62 on the drive side, the slide pulley 64b correspondingly moves in the upper and lower direction against the force of the spring 69, so that the running speed of the intermediate shaft 66 is changed by the motion of these pulleys on the drive side and on the driven side. The thus constructed variable pitch diameter belt speed changing device 65 works both as a speed increasing device and a speed reducing device with a point at which the radius of contacting circle is in agreement between the drive side and the driven side as a boundary, i.e., with a speed-changing ratio of 1:1 as a boundary. In particular, the speed changing device 65 which is installed in the initial stage and which works as a speed increasing device, presents advantageous functions as will be mentioned later.

The intermediate shaft 66 is rotatably supported at its central portion by a cylindrical support member 80 via two bearings 81a and 81b. Further, as will be mentioned with reference to FIG. 2F, when the covering 28 is removed, the support member 80 is allowed to move between the input shaft and the intermediate shaft sliding on a standing plate 86 indicated by a broken line actuated by a take-up mechanism device 84 consisting of bolts 82, nuts 83 and a projection 85 on the bottom of the frame.

A constant-speed pulley or sheave 91 of a small diameter is attached to the lower free end of the intermediate shaft 66. Three V-shaped belts 92a, 92b and 92c are fitted to three belt grooves formed in the side wall of the pulley 91 so that they will run around a constant-speed pulley 93 of a large diameter attached to the output rotary shaft 95 thereby to constitute a reduction device 90 having a predetermined reduction ratio. According to this embodiment, the axis of the output shaft 95 is in concentric with the axis of the input shaft, i.e., in concentric with the rotor 60 of the motor, so that the tension of the belts can be easily adjusted or any other maintenance operation can be easily carried out by means of the take-up mechanism 84.

On the other hand, the output shaft 95 is supported at its central portion by an output flange 99 via two bearings 96a and 96b. The guide flange 99 is fastened via an upper flange 99a and a lower flange 99c to the bottom of the frame or box-like housing 27 and to a circular installation plate 100 which is provided at the center of the stay 33. The output shaft 95 and the guide flange 99 protrude downwardly through a hole formed in the installation plate 100 and a protruded holding member 99b, and from the tip of the output shaft 95 is stretched a fan-mounting portion 95' beyond an oil seal 97 and a stop cover 98. The widely known fan means 24 having four pieces of fan blades 101 and a mounting fitting 102 is mounted on the mounting portion 95' being fastened by two nuts.

A heat-preventing blower 67 consisting of a vane wheel 77 and an eccentric casing 76 which rotate together with the driving pulley means 62 is attached to the back surface of the slide pulley 62b of the pulley 62 on the drive side, in order to introduce the external cooling air having small humidity into the chamber 61. On the other hand, the air which has exchanged the heat in the chamber 61 is exhausted out of the chamber through an outlet port 33 formed in the upper surface of the covering 28. The static pressure in the chamber 61 is so high that the external air of high humidity does not reversely flow into the chamber 61 through the outlet port 33. The casing may be a conventional scroll or spiral casing which is used for a centrifugal fan such as a conventional Sirrocco fan.

FIG. 2B is a cross-sectional view along the line B—B' of FIG. 2A. The portions illustrated with reference to FIG. 2A are not mentioned here. FIG. 2B principally illustrates a speed control device 67, a pilot electric motor control device 110, and a cylindrical support member 80. A housing or frame 27 is of an oval shape having a protruded portion 27' for installing a tension pulley means or sheave means 120. Reference numberal 27" denotes an open portion for installing a covering 28. The frame 23 incorporates the pilot electric motor control device 110 which consists of a widely known recycling motor 111 secured to a cover 114, a reduction gear 112 and a sprocket 113 of a small diameter. When the electric motor 111 is actuated by the external proportional signals that will be mentioned later, the driving force of the sprocket 113 is transmitted to a sprocket 73 of a large diameter via a chain 74, whereby the speed control device 67 continuously and steplessly controls the speed changing ratio of the transmission device 65. On the other hand, the cylindrical support member 80 has a horizontally protruded plate-like arm 80a with three elongated holes 87a, 87b and 87c formed therein. Stud bolts of poles 86a, 86b and 86c erected from the bottom of the housing or frame 27 and machined in a trapezoidal shape are inserted in the elongated holes 87a, 87b and 87c of the arm 80a, and the support member 80 is fastened by nuts 88a, 88b and 88c. The elongated holes 87a, 87b and 87c are to replace the belts or to adjust the tension of the belts.

FIG. 2C is a perspective view showing a relation between the heat-preventing centrifugal blower means 75 and the pulley means 62 on the drive side, that were already illustrated in FIG. 2A. A casing 76 consists of a cylinder 76a, a spiral portion 76b and a blowing portion 76c. The cylinder 76a has a flexible pipe 31' which is communicated with the introduction conduit 31 illustrated in FIG. 2A. A pulley 62b serves as a side wall of the spiral portion 76b. The thus constructed blower 75 supplies the cold outdoor air in the direction of arrow with the turn of the pulley 62. The blower 75 needs not be limited to the above-mentioned embodiment only, but any type of blower may be used provided it works to introduce the external air having small humidity into the chamber 61. For instance, a Sirrocco fan with a d-c motor may be installed on the frame, or a suction-type fan may be installed on the frame and may be actuated by a belt speed-increasing device, in use of the rotary power of the input shaft 60.

Figure 2D:
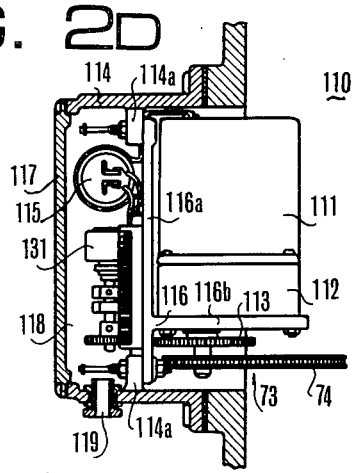

FIG. 2D is a diagram illustrating the setup of the pilot electric motor control device 110 of FIG. 2B. The electric motor 111, gear reduction device 112, gear transmission device 113 and sprocket 73 are installed on one side of a T-shaped holder plate 116 formed of a vertical plate 116a and a lateral plate 11b which are mounted on the arms 114a of the cover 114. A terminal chamber 118 is formed on the other side of the T-shaped holder plate 116. External lead wires are introduced into the terminal chamber 118 through an open end 119 of an operation cover 117. The terminal chamber 118 accommodates a potentiometer 131 and a capacitor 115 that will be mentioned later. Here, the control device 110 may be replaced by a conventional hydraulic mechanism.

Figure 2E:
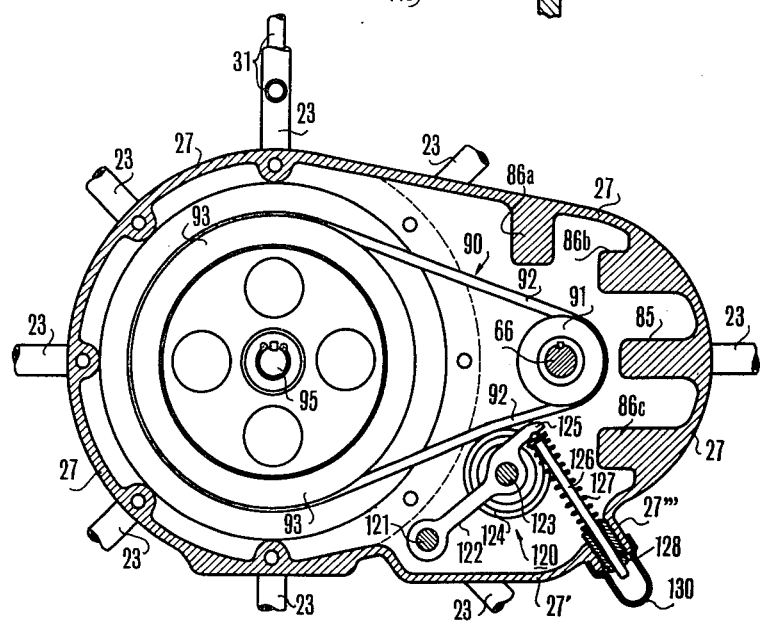

FIG. 2E is a cross-sectional view along the line E—E' of FIG. 2A, and illustrates the setup of a constant-speed belt reduction device 90 and a tension adjusting pulley mechanism 120. The belt reduction device 90 has two pulleys 91 and 93 with greatly different ratio of radii such that the driving force which is as great as possible can be transmitted. On the other hand, the tension adjusting pulley device 120 works to compensate the elongation of the belt 92. A support pole 123 is mounted on an arm 122 supported by a shaft 121 which is studded on the bottom surface of the frame 27, and a pulley or sheave 124 is supported by the support pole 123 to press the back surface of the belt 92. An adjusting rod 126 urged by a coil spring 127 is pivotted to the tip 125 of the arm 122. The adjusting rod 126 works to adjust the pressing force exerted on the belt 92 depending upon the manual adjustment of a screw 128 mounted in a frame 27''', and one end of the adjusting rod 126 protrudes beyond the chamber through a tapered hole formed in the screw 128 so that the intensity of the pressing force can be visually measured through a transparent cover 130 which prevents the infiltration of water droplets, and can be adjusted manually from outside.

FIG. 2F is a perspective view illustrating the relation between the cylindrical support member 80 and the housing or frame 27, that was mentioned already with reference to FIGS. 2A to 2B. As mentioned already, the support member 80 supporting the intermediate shaft 66 on which are mounted the pulley means 64 and the pulley 91 of a small diameter, is fastened by nuts 88a, 88b and 88c which fit to stud bolts 89a, 89b and 89c which are inserted in three elongated holes formed in the fastening arm 80a. The position of the support member 80 is determined by the take-up mechanism means 84 illustrated in FIG. 2A while the nuts are being loosened.

According to the fan control device 26 of the embodiment, the variable pitch diameter belt speed changing device 65 and the constant pitch reduction device 90 are accommodated in a small and sealed chamber 61. These devices, however, may be separately installed; i.e., the belt speed changing device 65 and the main motor 29 may be installed on the outer side of the fan stack of the cooling tower 10. Further, although the belt reduction device 90 was used as a constant pitch reduction device in this embodiment, it is also allowable to employ any widely known gear reduction device.

The operation of the fan illustrated with reference to FIGS. 2A to 2F is briefly mentioned below. In order to transmit the rotational power of the main motor 29 according to the present invention, a continuous or step-less speed increasing/decreasing device, i.e., a variable pitch diameter belt speed changing device 65 is coupled to the transmission device of the first stage, and the constant pitch reduction device 90 is coupled to the transmission device of the second stage via an intermediate shaft 66. As mentioned earlier, when the radius of contacting circle between the belt 63 and the pulley means 62 is the same as the radius of contacting circle between the belt 63 and the pulley means 64, the reduction ratio of the variable pitch diameter belt speed changing device is 1 to 1 and the speed or rotational frequency of the intermediate shaft 66 is equal to that of the input shaft 60 at that time. With this point as a boundary, the variable pitch diameter belt speed changing device 65 works both as a speed increasing device and as a speed reducing device.

This mechanism may appear to be wasteful because the speed which is once increased is reduced again by the reduction device 90. This, however, presents a very favorable condition for the cooling tower, and other cooling apparatus.

Namely, the shaft horsepower W required for the fan 24 of the cooling tower or cooling apparatus varies as the third power of the running speed N. A maximum of power is required when the fan speed is increased at a maximum rate. Therefore, the transmission device may be designed on the basis of the horsepower transmitted during that moment. However, unlike general machine tools, the fan for cooling towers is subjected to less variation in the load, and operates with relatively small loads. On the other hand, the allowable transmission horsepower Wo of the belt is determined by the product of the running speed N and the tension T of the belt. Hence, by using the transmission device which works to increase the running speed as is aforementioned, the tension T can be reduced because the running speed N is high. Consequently, by employing the variable pitch diameter pulley speed changing device 65 which increases the speed as the first transmission device, the size and weight of the speed changing device can be reduced so that it is very favorably and cheaply installed on the cooling apparatus 10. Besides, the transmission device 26 which is constructed in a single housing as done by the embodiment of the present invention, enables the maintenance operation very easy.

Below are mentioned the setup and operation of the electronic adjustment circuit 50 of FIG. 3A. The electronic adjustment circuit 50 according to the embodiment is a servo adjustment device for fully automatically controlling the temperature of the cooling water, and serves to accomplish the fan control system of the present invention together with the fan control device 25 illustrated in FIGS. 2A to 2F. The temperature adjustment circuit used for the present invention may employ a widely known controlling instrument such that the temperature of the cooling water is manually set and is controlled relying upon a difference between the measured temperature and the set point temperature.

Referring to FIG. 3A, the adjustment circuit 50 consists of three circuits, i.e., a proportional adjustment circuit 130, a portion of the pilot electric motor control device 110, and a soft-start control circuit 160. FIG. 3A further diagramatizes three-phase alternating current power lines $a_1$, $a_2$ and $a_3$ for feeding power to the main motor 29. Electric power is supplied to the adjustment circuit 50 from phases R and S of the three-phase power lines via feeder lines 155 and 156 and a well known voltage doubler circuit 153. The soft start control circuit 160 has a manual start switch 161, a manual stop switch 162, and three relays or switch 1R, 2R and 3R. The electric power is also supplied through the feeder lines 155 and 156 from the control circuit 160 to a recycling motor 111 of the pilot electric control device 110. A motor which operates on three-phase power may be used as the pilot electric motor control device 110.

The proportional adjustment circuit 130 has two bridge circuits 132 and 135 which are connected together via grounded point 133. The upper bridge circuit 132 contains resistors $r_1$, $r_2$ and $r_3$ and a feedback potentiometer 131 (hereinafter referred to as FBP) for adjusting the speed changing ratio of the transmission device 26, and to the lower bridge circuit 135 is connected resistors $r_4$, $r_5$ and $r_6$ and a detector for detecting the temperature of the cooling water at the outlet port, i.e., a conventional temperature measuring resistor 51 such as Pt bulb. The proportional adjustment circuit 130 in this embodiment works to control the running speed of the fan depending only upon the temperature of the cooling water at the outlet port. The outputs of the bridge circuits 132 and 135 are fed to operation amplifiers 137 and 138 and are amplified. The thus amplified outputs x and y pass through resistors and produce deviation signals at a connection point 141. The deviation signals are then fed to an operation amplifier 142. Either the speed changing ratio of the power transmission or the temperature of the cooling water is indicated by an indicator 140 via a change-over switch 139. The deviation signals of the amplifier 143 are fed to an operation amplifier 144 via a filter 143. To the non-inverted input of the operation amplifier 144 is applied a positive feedback from the output thereof via a resistor, and to the inverted input is applied a negative feedback via a conventional blind-zone or dead-zone circuit 145 consisting of four diodes. This is to prevent the hunting in the output thereby to protect from the increase of the "ON-OFF" cycle for the pilot recycling motor 111.

The output of the amplifier 144 is supplied to a drive circuit 146 on the side of increasing the speed and to a drive circuit 147 on the side of decreasing the speed, whereby the relays or switches 150 and 151 are controlled via semiconductor switches 148 and 149. Further, to the circuit 146 on the side of increasing the speed is connected a contact point 2R4 which is connected in series with a transistor switch 148, and to the circuit 147 on the side of decreasing the speed is connected a connection point 2R2 which is connected in parallel with a transistor switch 149. The relays 150 and 151 have output contacts 150a and 151a, and control the rotating speed of the recycling motor 111. The motor 111 is a conventional one consisting of drive coils 111a, 111b, and a capacitor 115. Limit switches HS and LS are connected to the motor 111 to prevent excess of rotation, or in other words, the electric power from the power supply terminal 157 is controlled by the limit switches HS and LS.

On the other hand, the soft start control circuit 160 functions to limit the correlation between the main motor 29 and the pilot motor 111 as well as to gently start the transmission device 26 from the lowest speed, i.e., from the stage of light load. The start control circuit 160 includes a relay 1R having normally open contacts 1R1 and 1R2, a relay 2R having normally open contacts 2R1, 2R2 and normally closed contacts 2R3, 2R4, and a relay 3R having normally open contacts 3R1, 3R2, 3R3 and 3R4. The start control circuit 160 controls three circuits, i.e., controls the proportional adjustment circuit 130, pilot electric motor control device 110 and main fan motor 29. Reference numeral 163 denotes a conventional thermal protector to protect main fan motor 29.

Prior to illustrating the operation of the circuit of FIG. 3A, the circuit of FIG. 3B is mentioned below. FIG. 3B illustrates another embodiment in which an electronic proportional adjustment circuit 130 works to compensate the cooling capacity of the cooling apparatus or cooling tower responsive to the signals of outdoor air or atmospheric conditions which are varying day after day. The setup of this embodiment is nearly the same as that of FIG. 3A. Hence, FIG. 3B illustrates the circuit of a different portion only. In addition to the detector 51 for detecting the dry bulb temperature of the cooling water at the outlet port, a detector 53 for detecting the dry bulb temperature of the outdoor air which is taken into the tower and a detector 54 for detecting the relative humidity of the outdoor air are connected to the circuit as shown in FIG. 3B. As mentioned already, the cooling tower is usually affected by the outdoor enthalpy amount or the outdoor wet bulb temperature. The detectors 53 and 54 employed here are to substantially efect the compensation simulating these quantities. When the control does not require so much precision, the difference between the temperature of the cooling water at the outlet port and the outdoor temperature may be employed without using the humidity detector 54. Or as mentioned earlier, when precision is not much required, a widely known atmospheric condition detector 52 (refer to FIG. 1) such as outdoor wet bulb temperature detector or outdoor enthalpy detector may be connected through an amplifier 138 to the terminals m and n instead of using the outdoor temperature detector 53, based upon the principle of the cooling tower, in order to feed, as control signals, the difference between the temperature of the cooling water at the outlet port and these quantities of the outdoor air conditions, as has been well known among those skilled in the art. Here, however, the atmospheric condition detector 52 must be capable of converting the quantity of the atmospheric conditions into electric signals such as changes in resistance. Furthermore, the system can also be controlled depending upon the differential signals between the temperature of the cooling water at the inlet port and the temperature of the cooling water at the outlet port. Moreover, depending upon the apparatus to which is applied the cooling equipment, namely depending upon the kind of the refrigerators, it is often advantageous to control the system relying upon the temperature of the cooling water at the inlet port, as is well known.

Below are briefly mentioned the operations of the circuits of FIGS. 3A and 3B. A manual main switch 38 is closed and then another manual starter switch 161 is closed so that the relay 3R is energized through contact point 2R3 and protector 163. The relay 3R is self-maintained by the contact point 3R1. As the contact point 3R2 is closed, the main motor 29 is caused to operate. At the same time, the electric power is supplied also to the adjustment circuit 130 by the close of the contact point 3R3. As the power interlocking contact 3R4 is closed, the electric power is also supplied to the pilot motor control portion 110. In this case, the relay 2R has been de-energized. However, as the low limit switch LS is closed so that the adjustment circuit 160 performs the proportional controlling, the relay 1R is energized before long and the contact point 1R2 is closed so that the pilot motor control portion 110 starts to operate.

First, when the temperature of the cooling water at the outlet port of the cooling tower shown in FIG. 1 is relatively high, the output signal y of the bridge circuit 135 is larger than the output signal x of the bridge circuit 132, whereby a positive signal appears on the output z of the amplifier 142. A proportional switching output is produced from the amplifier 144 to drive a relay 150 of the speed-increasing drive circuit 146. Hence, a contact point 150a is inverted so that the recycling motor 110 runs in such a direction that the speed-changing device 65 increases the speed of the fan 24 in the manner, as is aforementioned. The signals are transmitted to a speed control unit 67 of the speed-changing device 65 via a chain 74, whereby the radius of contacting circle between the pulley means or sheave means 62, 64 and the belt 63 is changed as mentioned earlier such that the running speed of the output shaft 95 and the fan continuously and proportionally increases. As the output of the amplifier 142 gradually decreases and enters the blind zone determined by the blind-zone or dead-zone circuit 145, the relay 150 is de-energized, the pilot motor control portion 110 ceases to operate, and the main motor 29 only is allowed to rotate. Conversely, as the temperature of the cooling water at the outlet port gradually decreases, and as the output x becomes greater than the output y so that a negative signal produced by the amplifier 142 reaches a predetermined value, a speed-decreasing command circuit 147 is energized causing the relay 151 to be excited and the contact point 151a only to be closed. Then, contrary to the abovementioned case, the recycling motor 111 is caused to rotate in such a direction that the speed-changing device 65 decreases the speed of the fan 24. Therefore, the running speed of the output shaft 95 of the transmission device and the fan gradually decreases in a continuous and proportional manner. As the speed decreases and reaches a predetermined blind or dead zone, the operation for decreasing the speed is stopped and the main fan motor 29 only is allowed to run.

The above-mentioned operation is always carried out within a proportional band determined by the adjustment circuit 160 responsive to the change in temperature of the cooling water, such that the temperature of the cooling water is always maintained within a predetermined range. The bridge circuit 135' of FIG. 3B responds to the change in the outdoor atmospheric conditions. For instance, when the outdoor wet bulb temperature is low, the cooling efficiency of the cooling tower substantially increases, whereby the adjustment circuit 160 so works that the running speed of the fan 24 is decreased correspondingly. Also, when the outdoor wet bulb temperature high, in opposite, the cooling efficiency substantially decreases, whereby the adjustment circuit 160 so works that the running speed of the fan 24 is increased correspondingly.

Next, when a manual stop switch 162 is depressed, the relay 2R is energized via the contact point 3R1 and switch 162, and is self-maintained by the contact point 2R1, so that the contact point 2R3 is opened. Furthermore, since the normally open contact point 2R2 short-circuits the transistor 149 at the same time, the relay 151 is energized causing the contact point 2R4 to be opened, so that the relay 150 is forcibly de-energized. In this case, the relay 3R has been excited so that the main motor 29 continues to run. The contact point 3R4 has also been closed, so that the pilot portion 110 forcibly causes the speed-changing device 65 to reduce the speed upon the inversion of the contact point 151a. The speed is then decreased to such a degree that the limit switch LS on the low-speed side is opened, whereby the recycling motor 111 is stopped, the relay 1R is de-energized to open the contact point 1R1, and hence the relay 3R is de-energized. Consequently, the main motor 29 ceases to run, the power supply to the adjustment circuit 130 is interrupted, the relay 2R is liberated from the self-maintained state due to the opening of the contact point 3R1, and the whole control system comes into halt.

Namely, the start control circuit 160 so works that the operation comes into halt with the belt 63 being positioned under the greatest reduction ratio condition, i.e., with the belt 63 being held around the greatest circumference of the pulley means 64 on the driven side. This presents advantage in regard to very easily carrying out maintenance operation such as replacement of the belt or adjustment of the tension, as well as to gently start again the apparatus from the state of small load, i.e., from the state of the lowest speed. This helps reduce the consumption of electric power by the main motor 29 and often eliminate auxiliary starting equipment such as a star-delta change type of motor starter. Further, even when the switch LS on the low-speed side is opened at the moment of starting, the speed-increase command circuit 146 operates first. The switch LS is thereafter closed before long, and the proportional operation of the adjustment circuit 160 is not interrupted. Here, the relays 1R, 2R and 3R may be the customarily employed solid state switches.

According to the present invention mentioned in the foregoing, the temperature of the cooling water of the cooling apparatus such as cooling tower can be freely controlled by means of cheaply constructed fan, and electronic adjustment circuit, thereby presenting many other advantages, contributing to the reduction in the requirement of energy and public hazard.

What is claimed is:

1. A fan control system for varying the amount of air which is forcibly introduced into a cooling apparatus in which the cooling water sprayed therein is contacted to the air and is cooled, comprising:
   (a) a fan;
   (b) a main fan motor for driving said fan;
   (c) a power transmission means for transmitting the rotational power of said main fan motor to said fan, said power transmission means having a variable pitch diameter belt speed changing means which varies the rotating speed of said rotational power such that the amount of air introduced into said cooling apparatus can be continuously changed, and a controller coupled to said variable pitch diameter belt speed-changing means to change its speed-changing ratio responsive to a pilot electric control means;
   (d) said pilot electric control means having a control motor which automatically drives said controller responsive to external signals; and
   (e) an electronic adjustment circuit means having a detector for detecting the temperature of said cooling water to supply said external signals to said pilot electric control means thereby to automatically control the cooling capacity of said cooling apparatus.

2. A fan control system for cooling apparatus according to claim 1, wherein said main fan motor is an a-c induction motor which operates on a three-phase a-c power supply.

3. A fan control system for cooling apparatus according to claim 1, wherein said variable pitch diameter belt speed changing means has variable pulley means consisting of a combination of a fixed pulley and a slide pulley for holding a belt, and the radius of contacting circle between said belt and said variable pulley is made variable by the operation of said controller.

4. A fan control system for cooling apparatus according to claim 3, wherein said fan is disposed in an air-blowing port of said cooling apparatus.

5. A fan control system for cooling apparatus according to claim 4, wherein said fan is directly coupled to a rotational output shaft of said power transmission means, and said main fan motor and said power transmission means are disposed in the air-blowing port of said cooling apparatus.

6. A fan control system for varying the amount of air which is forcibly introduced into a cooling apparatus in which the cooling water sprayed therein is contacted to the air and is cooled, comprising:
   (a) a fan;
   (b) a main fan motor for driving said fan;
   (c) a power transmission means for transmitting the rotational power of said main fan motor to said fan, said power transmission means having a variable pitch diameter belt speed changing means which varies the rotating speed of said rotational power such that the amount of air introduced into said cooling apparatus can be continuously changed, a reduction device which is coupled to said variable pitch diameter belt speed changing means to reduce the rotating speed thereof by a predetermined ratio, and a controller coupled to said variable pitch diameter belt speed changing means to change its speed-changing ratio responsive to a pilot electric control means;
   (d) said pilot electric control means having a control motor which automatically drives said controller responsive to proportional output signals; and
   (e) an electronic adjustment circuit means having a detector for detecting the temperature of said cooling water to supply said proportional output signals to said pilot electric control means thereby to automatically control the cooling capacity of said cooling apparatus.

7. A fan control system for cooling apparatus according to claim 6, wherein said variable pitch diameter belt speed changing means permits the belt to be held between first variable pulley means and second variable pulley means consisting of a combination of a fixed pulley and a slide pulley, and the radius of contacting circle between said belt and said pulley means is made variable by the operation of said controller.

8. A fan control system for cooling apparatus according to claim 7, wherein said reduction device is a belt reduction device consisting of a second belt, a first fixed pulley and a second fixed pulley.

9. A fan control system for cooling apparatus according to claim 8, wherein said reduction device includes a tension pulley adapted to said second belt.

10. A fan control system for cooling apparatus according to claim 9, wherein said power transmission means has an input rotary shaft which is in agreement with a rotor of said main fan motor, an output rotary shaft for mounting said fan, and an intermediate rotary shaft, wherein said input rotary shaft and said intermediate rotary shaft are coupled together by said variable pitch diameter belt speed changing means, and said output rotary shaft and said intermediate rotary shaft are coupled together by said belt reduction device, and wherein said variable pitch diameter belt speed changing means has a belt which runs between said first variable pulley mounted on said input rotary shaft and said second variable pulley mounted on said intermediate rotary shaft in a manner to change the running speed.

11. A fan control system for cooling apparatus according to claim 10, wherein said power transmission means has a holding member which rotatably holds said intermediate rotary shaft, and said holding member holds said intermediate rotary shaft between a portion at which said variable pitch diameter belt speed changing means is mounted on said intermediate rotary shaft and another portion at which said belt reduction device is mounted on said intermediate rotary shaft.

12. A fan control system for cooling apparatus according to claim 11, wherein said power transmission means is installed in a hermetically sealed chamber which is formed by a housing.

13. A fan control system for cooling apparatus according to claim 12, wherein said pilot electric control means is installed in said housing, and is interlocked to said controller via a chain.

14. A fan control system for cooling apparatus according to claim 13, wherein said tension pulley has a tension adjusting device and a tension indicator, which are installed in said housing.

15. A fan control system for varying the amount of air which is forcibly introduced into a cooling apparatus in which the cooling water sprayed therein is contacted to the air and is cooled, comprising:
   (a) a fan;
   (b) a main fan motor for driving said fan;

(c) a power transmission means for transmitting the rotational power of said main fan motor to said fan, said power transmission means having a variable pitch diameter belt speed changing means which varies the rotating speed of said rotational power such that the amount of air introduced into said cooling apparatus can be continuously changed, a controller coupled to said variable pitch diameter belt speed-changing means to change its speed-changing ratio responsive to a pilot electric control means, and a blower installed in and/or out of a housing to suck the air from outside said housing to cool the interior of the rooms;

(d) said housing which accommodates said power transmission means and which forms a sealed chamber, and which further has an exhaust port for exhausting the air after it has cooled the interior of said rooms;

(e) a pilot electric control means having a control motor which automatically drives said controller responsive to external output signals; and (f) an electronic adjustment circuit means having a detector for detecting the temperature of said cooling water to supply said external output signals to said pilot electric control means thereby to automatically control the cooling capacity of said cooling apparatus.

16. A fan control system for cooling apparatus according to claim 15, wherein said blower comprises a Sirrocco fan constructed by a casing and vanes driven by the rotational force of said main fan motor.

17. A fan control system for cooling apparatus according to claim 16, wherein said housing accommodating said power transmission means and said fan are installed in an air-blowing port of said cooling apparatus, and said housing is provided with a conduit which communicates an air-introducing port provided on the outer side of said air-blowing port of said cooling apparatus with the chamber in said housing.

18. A fan control system for varying the amount of air which is forcibly introduced into a cooling apparatus in which the cooling water sprayed therein is contacted to the air and is cooled, comprising:

(a) a fan;

(b) a main fan motor for driving said fan;

(c) a power transmission means for transmitting the rotational power of said main fan motor to said fan, said power transmission means having a variable pitch diameter belt speed changing means which varies the rotating speed of said rotational power such that the amount of air introduced into said cooling apparatus can be continuously changed, and a controller coupled to said variable pitch diameter belt speed changing means to change its speed-changing ratio responsive to a pilot electric control means;

(d) said pilot electric control means having a control motor which automatically drives said controller responsive to external proportional output signals; and (e) an electronic adjustment device for feeding said external proportional output signals to said pilot electric control means, said electronic adjustment device having a circuit for proportionally controlling the rotating speed of said fan responsive to the output of a detector which detects the temperature of the cooling water at the outlet port of said cooling apparatus and responsive to the output of a detector which detects the conditions of the external atmosphere introduced into the cooling apparatus.

19. A fan control system for cooling apparatus according to claim 18, wherein said adjustment device has a potentiometer for detecting the speed-changing ratio of said variable pitch diameter belt speed changing means and a comparator circuit for comparing a speed-changing ratio signal of said potentiometer, a signal of said temperature detector which measures the temperature of the cooling water at the outlet port of the cooling apparatus, and a condition signal of said detector which detects the atmospheric conditions, and wherein said external control signals are fed back to said potentiometer thereby to constitute a servo adjustment device.

20. A fan control system for cooling apparatus according to claim 19, wherein said atmospheric condition detector is the one which detects the outdoor dry bulb temperature.

21. A fan control system for cooling apparatus according to claim 19, wherein said atmospheric condition detector is the one which substantially and electrically detects the outdoor enthalpy amount.

22. A fan control system for cooling apparatus according to claim 21, wherein said atmospheric detector consists of a detector for detecting the dry bulb temperature of the outdoor air and a detector for detecting the relative humidity of the outdoor air.

23. A fan control system for varying the amount of air which is forcibly introduced into a cooling apparatus in which the cooling water sprayed therein is contacted to the air and is cooled, comprising:

(a) a fan;

(b) a main fan motor for driving said fan;

(c) a power transmission means for transmitting the rotational power of said main fan motor to said fan, said power transmission means having a variable pitch diameter belt speed changing means which varies the rotating speed of said rotational power such that the amount of air introduced into said cooling apparatus can be continuously changed, and a controller coupled to said variable pitch diameter belt speed changing means to change its speed-changing ratio responsive to a pilot electric control means;

(d) said pilot electric control means which automatically drives said controller responsive to external signals;

(e) an electronic adjustment circuit device having a detector which detects the temperature of said cooling water to supply said external signals to said pilot electric control device thereby to automatically control the cooling capacity of said cooling apparatus; and (f) a start control circuit which is connected to said electronic adjustment circuit device and to said main fan motor, and which supplies control signals to said pilot electric control means such that said fan comes into halt in a state of the minimum running speed when said fan control system is stopped.

* * * * *

UNITED STATES PATENT AND TRADEMARK OFFICE
CERTIFICATE OF CORRECTION

PATENT NO. : 4,252,751

DATED : February 24, 1981

INVENTOR(S) : Naomichi Shito

It is certified that error appears in the above—identified patent and that said Letters Patent is hereby corrected as shown below:

In the Abstract, line 13, "chaning" should be --changing--.
Column 1, line 11, "fell" snould be --falling--.
Column 1, line 36, "constant.it is" should be --constant. It is--
Column 6, line 60, "numberal" should be --numeral--.
Column 7, line 38, "11b" should be --116b--.
Column 9, line 7, "enables" should be --makes--.
Column 10, line 56, "efect" should be --effect--.
Column 12, line 27, cancel ", in opposite,"
Column 16, claim 21, line 24, "19" should be --20--.
Column 16, claim 22, line 2, after "atmospheric" insert --condition--.
Column 16, claim 22, line 28, "21" should be --19--.

Signed and Sealed this

Sixteenth Day of June 1981

[SEAL]

Attest:

RENE D. TEGTMEYER

*Attesting Officer*     *Acting Commissioner of Patents and Trademarks*